(12) United States Patent
Straub et al.

(10) Patent No.: US 9,154,854 B1
(45) Date of Patent: Oct. 6, 2015

(54) NOTIFICATION IN A NETWORK ENVIRONMENT

(71) Applicants: Albert Straub, Westminster, CO (US); Niem Dang, Sterling, VA (US); Edward P. Galt, III, Boulder, CO (US)

(72) Inventors: Albert Straub, Westminster, CO (US); Niem Dang, Sterling, VA (US); Edward P. Galt, III, Boulder, CO (US)

(73) Assignee: Time Warner Cable Enterprises LLC, New York, NY (US)

(*) Notice: Subject to any disclaimer, the term of this patent is extended or adjusted under 35 U.S.C. 154(b) by 249 days.

(21) Appl. No.: 13/622,956

(22) Filed: Sep. 19, 2012

(51) Int. Cl.
*H04N 21/81* (2011.01)
(52) U.S. Cl.
CPC ................... *H04N 21/814* (2013.01)
(58) Field of Classification Search
CPC ..................................................... H04N 21/814
USPC .................................................................. 725/33
See application file for complete search history.

(56) References Cited

U.S. PATENT DOCUMENTS

| | | | |
|---|---|---|---|
| 6,543,051 B1* | 4/2003 | Manson et al. | 725/33 |
| 8,509,727 B2* | 8/2013 | Medford et al. | 455/404.1 |
| 2006/0049934 A1* | 3/2006 | Breen | 340/531 |
| 2007/0136743 A1* | 6/2007 | Hasek et al. | 725/33 |
| 2007/0199016 A1* | 8/2007 | Yun et al. | 725/33 |
| 2009/0228915 A1* | 9/2009 | Luu et al. | 725/33 |
| 2009/0228916 A1* | 9/2009 | Kim et al. | 725/33 |
| 2009/0235306 A1* | 9/2009 | Pugel | 725/33 |
| 2009/0271818 A1* | 10/2009 | Schlack | 725/33 |
| 2010/0186030 A1* | 7/2010 | Yun et al. | 725/33 |
| 2010/0306797 A1* | 12/2010 | Curran | 725/33 |
| 2011/0255535 A1* | 10/2011 | Tinsman | 370/390 |
| 2012/0059951 A1* | 3/2012 | Gutarin et al. | 709/233 |
| 2013/0007831 A1* | 1/2013 | Wu et al. | 725/116 |
| 2013/0159495 A1* | 6/2013 | Wang et al. | 709/224 |
| 2013/0247094 A1* | 9/2013 | Hardin et al. | 725/33 |

* cited by examiner

*Primary Examiner* — Hunter B Lonsberry
*Assistant Examiner* — Alexander Q Huerta
(74) *Attorney, Agent, or Firm* — Chapin IP Law, LLC

(57) ABSTRACT

A content management resource transmits a received digital data stream in a respective network data channel to one or more subscribers. The content management resource receives an emergency notification control signal, which indicates occurrence of an emergency message. In response to receiving the emergency notification control signal, the content management resource transmits the emergency message in the digital data channel to the one or more subscribers in lieu of transmitting the received digital data stream of content in the data channel to the one or more subscriber. Thus, a subscriber can tune to a particular channel to play back selected content and be apprised, via receipt of the message over the particular channel, of a corresponding condition such as an emergency.

11 Claims, 12 Drawing Sheets

NOTIFICATION IN A NETWORK ENVIRONMENT

BACKGROUND

The so-called conventional emergency broadcast system was used between 1963 and 1997 to notify television viewers of an emergency. In general, the emergency broadcast system provided the president a way to quickly communicate an emergency message to the public. For example, in the event of an emergency, broadcast stations would receive an analog emergency message produced by the president. In accordance with emergency broadcast rules, the broadcast stations would nationally broadcast the analog-based emergency message in lieu of an originally scheduled analog signal. In this manner, the public could be easily notified in the event of an emergency.

In contrast to the conventional emergency broadcast system implemented years ago, it is now more common than ever for computer users to stream video via IPTV (Internet Protocol TeleVision) to their playback devices (e.g., iPad™, iPod™, personal computer, etc.). The mode of distributing content via IPTV is substantially different than prior conventional methods of broadcasting content, which was transmitted via analog signals. In accordance with IPTV and other digital broadcasts, and in contrast to prior analog transmissions, today, portions of content are digitized into data packets that are subsequently transmitted to a subscriber domain.

In accordance with digital content distribution services and one proposed type of conventional emergency notification method, a server in the network can receive notification of an emergency message. Via transmission of individual unicast-type messages to playback devices in the network environment, the playback devices can be notified of the occurrence of the emergency and corresponding message. Upon receipt of the notification, playback devices tune to a different channel to receive and playback an available emergency message. In this manner, subscribers can be notified in the event of an emergency.

BRIEF DESCRIPTION OF EMBODIMENTS

Conventional methods of providing notification of an emergency message suffer from a number of deficiencies. For example, as mentioned above, a playback device can be configured to monitor for the presence of an emergency alert signal. As discussed above, the emergency alert signal can indicate to tune to a different channel to receive an emergency message. Tuning to a different channel can take a substantial amount of time. By the time the playback device is properly tuned to receive the emergency message on the different channel, all or part of the emergency message may be over.

As mentioned above, as an alternative to broadcasting an emergency alert notification, it is possible to notify subscribers in a unicast manner. In such an instance, each subscriber can be notified, one at a time, via a specifically targeted alert notification. The technique of transmitting an emergency alert notification to each subscriber in a unicast manner to provide notification is often undesirable due the magnitude of users that need to be notified.

Embodiments herein deviate with respect to conventional techniques. For example, one embodiment herein is directed to providing digital-based notifications in a timely manner.

More specifically, a content management resource receives a digital data stream of content. The content management resource transmits the received digital data stream in a respective network data channel to one or more subscribers. In one embodiment, the content management resource receives and/or transmits the digital data stream of content as multiple encoded segments of information, data packets, etc. The content management resource can transmit the received digital data stream in any suitable manner (e.g., broadcast, unicast, multicast, etc.)

The content management resource can receive an emergency notification control signal indicating the occurrence or availability of a message such as an emergency message. In response to receiving the notification control signal (i.e., alert), the content management resource transmits the emergency message (such as an emergency notification digital data stream) in the data channel (e.g., unicast channel, broadcast channel, multicast channel, etc.) to the one or more subscriber in lieu of transmitting an original digital data stream of content in the data channel to the one or more subscriber. Thus, a subscriber can tune to a particular digital channel to play back selected content and be apprised, via receipt of the message over the particular digital channel, of an event such as an emergency.

In accordance with another non-limiting example embodiment, a content management resource can be configured to transmit or broadcast different content on each of multiple digital channels over a network to multiple subscribers in a cable network environment. The digital channels can include any of one or more of the following types of channels: IPTV type channels, DOCSIS type channels, non-DOCSIS type channels, video on demand channels, standard scheduled or linear cable television channels, etc.

Each of the multiple subscribers can selectively tune to the different digital channels and play back respective available content. As an example, the content management resource can be configured to broadcast a first data stream over a first digital channel of multiple digital channels. One or more of the multiple subscribers in a cable network environment can be tuned to play back the first data stream broadcasted on the first digital channel. The content management resource can be configured to broadcast a second data stream over a second channel. One or more of the multiple subscribers in the cable network environment can be tuned to play back the second data stream broadcasted on the second channel. In this example, assume that the first data stream includes different content than the second data stream.

By further way of non-limiting example, the content management resource can receive an emergency message (such as video encoded as a an emergency notification digital data stream) for broadcasting to the multiple subscribers playing back the different content on the different selected digital channels. The content management resource replicates the emergency message for transmission on the multiple digital channels in the event of an emergency. For example, the content management resource can produce a first instance of the emergency message and a second instance of the emergency message.

The content management resource broadcasts the replicated instances of the emergency notification digital data stream over each of the multiple different digital channels to notify the multiple subscribers of the emergency event. For example, in response to or during the emergency, the content management resource broadcasts the first instance of the emergency notification digital data stream over the first digital channel in lieu of transmitting portions of the first data stream over the first digital channel; the content management resource broadcasts the second instance of the emergency notification digital data stream over the second digital channel in lieu of transmitting portions of the second data stream over the second digital channel; and so on.

For unicast, multicast, etc., type of transmissions, the content management resource replicates the message and substitutes original content with the received message. In one embodiment, the content retrieved by a client resource is encoded in accordance with an adaptive bit rate data stream. That is, requested content can be retrieved over a unicast link in accordance with different levels of quality. The received message can be encoded and included in different bit rate data streams in accordance with the different levels of quality. During playback, a client resource can select amongst the available levels of quality to playback the requested content and emergency message (when present).

Accordingly, each of the one or more devices tuned to receive a respective digital channel is able to receive the emergency message without having to tune to a different channel. This notification method is desirable over conventional techniques because there is no need to individually address and notify each subscriber of the emergency message. Additionally, there is also no need for each client device to switch over to a new channel to receive the emergency message.

These and other more specific embodiments are disclosed in more detail below.

Any of the resources as discussed herein can include one or more computerized devices, servers, base stations, wireless communication equipment, communication management systems, workstations, handheld or laptop computers, or the like to carry out and/or support any or all of the method operations disclosed herein. In other words, one or more computerized devices or processors can be programmed and/or configured to operate as explained herein to carry out different embodiments as discussed herein.

Yet other embodiments herein include software programs to perform the steps and operations summarized above and disclosed in detail below. One such embodiment comprises a computer program product including a non-transitory computer-readable storage medium (i.e., any computer readable hardware storage medium or media) on which software instructions are encoded for subsequent execution. The instructions, when executed in a computerized device having a processor, program and/or cause the processor to perform the operations disclosed herein. Such arrangements may be provided as software, code, instructions, and/or other data (e.g., data structures) arranged or encoded on a non-transitory computer readable storage medium such as an optical medium (e.g., CD-ROM), floppy disk, hard disk, memory stick, etc., or other medium such as firmware or shortcode in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon to facilitate distribution of content and one or more emergency messages. The instructions, when executed by a processor of a respective computer device, cause the processor or multiple processors of the system to: receive a digital data stream of content; broadcast the received digital data stream in a data channel of a network environment to at least one subscriber; and in accordance with an emergency notification control signal, broadcast an emergency notification digital data stream in the data channel to the at least one subscriber in lieu of broadcasting the received digital data stream of content in the data channel to the at least one subscriber.

Yet another embodiments herein includes a computer readable storage medium and/or system having instructions stored thereon to provide a wide distribution of emergency messages. The instructions, when executed by a processor of a respective computer device, cause the processor or multiple processors of the system to: produce a multi-stream data channel; broadcast the multi-stream data channel over a network to subscribers in a cable network environment, the multiple subscribers tuning to different sub-channels of the multi-stream data channel and individually playing back content in the multi-stream data channel at multiple different locations in the cable network environment; receive notification of an emergency; and in accordance with the notification, populate each of the different sub-channels with an instance of an emergency notification digital data stream.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor, or within an operating system or within a software application.

As discussed herein, techniques herein are well suited for use in the field of distributing different levels of quality of adaptive bit rate encoded content in a network environment. However, it should be noted that embodiments herein are not limited to use in such applications and that the techniques discussed herein are well suited for other applications as well, etc.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein purposefully does not specify every embodiment and/or incrementally novel aspect of the present disclosure or one or more claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

Figure 1:
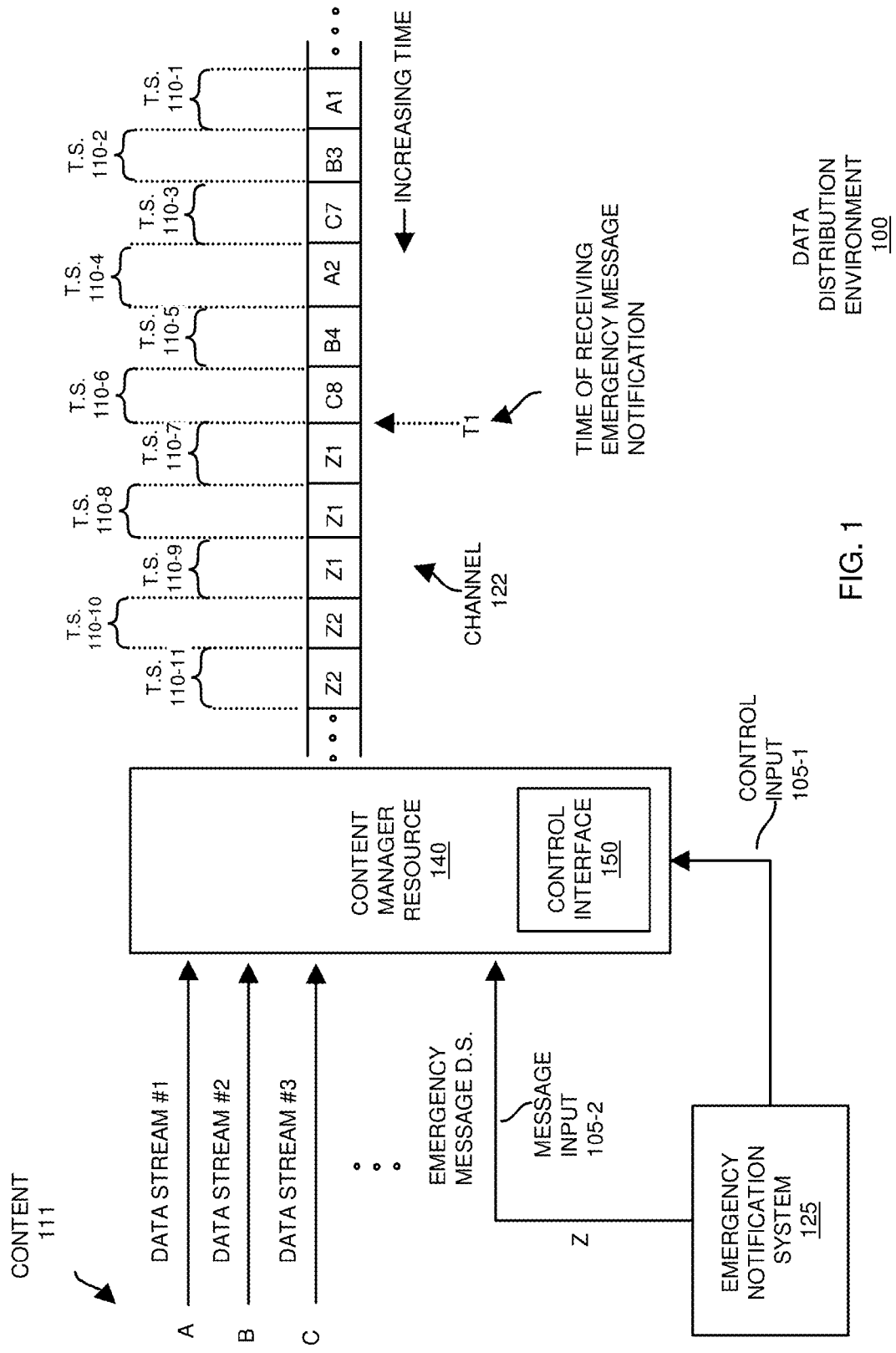
FIG. 1 is an example diagram illustrating processing of digital content and delivering emergency messages according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

According to one embodiment, a content management resource broadcasts a received digital data stream in a respective network data channel to one or more subscribers. The content management resource receives an emergency notification control signal, which indicates occurrence or availability of an emergency message. The emergency message can indicated that the emergency message is available immediately or will be available as some time in the future. In response to receiving the emergency notification control signal, the content management resource broadcasts the emergency message in the data channel or feed to the one or more subscribers in lieu of broadcasting the original received digital data stream of content in the data channel to the one or more subscriber. Thus, a subscriber can tune to a particular channel to play back selected content and be apprised, via receipt of the emergency message over the particular channel, of a corresponding emergency condition.

More specifically, FIG. 1 is an example diagram of a computer device according to embodiments herein.

As shown, data distribution environment 100 includes a content management resource 140. In one non-limiting example embodiment, the content management resource 140 is or includes a so-called statistical multiplexer, although the content management resource 140 can be any suitable type of processing resource capable of receiving one or more data streams and producing an output to one or more downstream nodes.

In this non-limiting example embodiment, the content management resource 140 receives content 111 such as one or more digital data streams (e.g., data stream #1, data stream #2, data stream #3, . . . ) from one or more upstream resources. Note that any of the data streams as discussed herein can be received as analog of digital signals and can be encoded in accordance with any suitable format.

Each of the digital data streams of content 111 can be partitioned into segments of suitable size for inclusion in channel 122. The data streams can be received on a single multi-stream data channel or multiple individual data stream or a combination of both.

Content management resource 140 includes segments (or portions) of the different data streams of content 111 in channel 122. The digital data streams can be encoded in accordance with any suitable digital encoding format. By way of a non-limiting example, the content 111 can be encoded in accordance with an MPEG (Moving Pictures Expert Group) format, etc.

As shown, the channel 122 can be partitioned to include time slots 110 (e.g., time slot 110-1, time slot 110-2, time slot 110-3, time slot 110-4, time slot 110-5, time slot 110-6, time slot 110-7, time slot 110-8, time slot 110-9, time slot 110-10, time slot 110-11, etc.). In one embodiment, the data conveyed in a respective time slot can include a program identifier value indicating to which data stream, sub-channel, etc., to which the corresponding segment of content belongs.

As shown, channel 122 can be a multi-stream data channel including any suitable number of sub-channels to convey content downstream. For example, time slot 110-1, time slot 110-4, time slot 110-7, time slot 110-10, etc., can be allocated to include segments of data for a first sub-channel in channel 122; time slot 110-2, time slot 110-5, time slot 110-8, time slot 110-11, etc., can be allocated to include segments of data for a second sub-channel in channel 122; time slot 110-3, time slot 110-6, time slot 110-9, etc., can be allocated to include segments of data for a third sub-channel in channel 122; and so on.

As previously discussed, the content management resource 140 can be configured to receive multiple digital data streams of content 111. The content management resource 140 produces the (multi-stream data) channel 122 to include sub-channels to convey the multiple digital data streams of content 111. In one embodiment, the sub-channels (and respective time slots) are interleaved amongst each other such that the segments of data streams are interleaved amongst each other for transmission downstream to one or more subscribers.

By way of a non-limiting example, the channel 122 outputted by the content management resource 140 can be a UDP (User Datagram Protocol) encapsulated MPEG (Moving Pictures Expert Group) feed.

The content management resource 140 initiates broadcasting of the channel 122 including multiple digital data streams to one or more users in a network environment. As mentioned, generation of the channel 122 as a multi-stream data channel is shown by way of non-limiting example only. If desired, the channel 122 can include only a single data stream.

Content management resource 140 can include a control interface 150. In this example embodiment, control interface 150 monitors control input 105-1 from emergency notification system 125. As discussed below, the emergency notification system 125 can support functions such as generating emergency messages, providing alert notifications that an emergency message is available, etc. In general, emergency notification system 125 can be any suitable resource capable of providing notification of the occurrence of an emergency and/or presence of an emergency message for broadcasting on channel 122.

The emergency notification system 125 can reside at any suitable location with respect to the content management resource 140. In one non-limiting example embodiment, the emergency notification system 125 resides at a remote location over a network with respect to the content management resource 140. The content management resource 140 can receive communications from the emergency notification system 125 via any suitable type of communication link.

Upon detection of an emergency event, the emergency notification system 125 communicates control input 105-1 over a respective network link to notify the content management resource 140 of the occurrence of the event. In one embodiment, the control input 105-1 indicates when the emergency message data stream Z is available for broadcast.

More specifically, prior to occurrence of an emergency event, the content management resource 140 broadcasts the received digital data stream #1 in channel 122 to one or more downstream resources (such as subscribers). A downstream resource may request transmission of the digital data stream #1 or the digital data stream #1 may be transmitted in accordance with a predetermined schedule. In response to receipt of the control input 105-1 from emergency notification system 125 indicating occurrence of an emergency event and/or emergency message, the content management resource 140 broadcasts one or more replications of the emergency notification digital data stream (e.g., message input 105-2 such as data stream Z) in the channel 122 to the one or more downstream subscribers in lieu of broadcasting the digital data stream #1.

As a more specific example, as shown, the content management resource 140 initially transmits segment A1 followed by segment B3 followed by segment C7 followed by segment A2 followed by segment B4 followed by segment C8, etc., in first respective time slots 110 in channel 122. As previously discussed, control input 105-1 indicates to switchover to transmitting the emergency message (i.e., emergency message data stream Z as received from emergency notification system 125 or other resource) in one or more of the sub-channels of channel 122. Upon switchover, the content management resource 140 transmits the emergency message data stream Z in one or more of the respective sub-channels of channel in lieu of transmitting the original content stream A, B, C.

As mentioned, the emergency message data stream Z (i.e., message input 105-2 of video, audio, etc.) can include segments Z1, Z2, Z3, Z4, etc. The segments can represent portions of video. In such an instance, upon activation of emergency switchover, the content management resource 140 initiates transmission of segments of data stream Z in each of the one or more sub-channels of channel 122 in lieu of transmitting respective segments of originally broadcasted content A, B, C.

Thus, instead of transmitting segment A3 in time slot 110-7 the content management resource 140 transmits segment Z1; instead of transmitting segment B5 in time slot 110-8 the content management resource 140 transmits segment Z1; instead of transmitting segment B5 in time slot 110-9 the content management resource 140 transmits segment Z1. Additionally, instead of transmitting segment A4 in time slot 110-10 the content management resource 140 transmits segment Z2; instead of transmitting segment B6 in time slot 110-11 the content management resource 140 transmits segment Z2; and so on.

As mentioned, the different sub-channels of data transmitted in channel 122 can be transmitted in accordance any suitable digital encoding format. Each of the encoding formats can be the same or different. That is, in one non-limiting example embodiment, content A can be encoded in accordance with a first encoding format; content B can be encoded in accordance with a second encoding format; content C can be encoded in accordance with a third encoding format; and so on. In accordance with another embodiment, each stream of content A, B, and C can be encoded in accordance with the same encoding format, etc.

Assume that the data stream Z is received in a unique format with respect to content A, B, and C. In such an instance, to maintain continuity when switching over from broadcasting the original content (e.g., A, B, C) to the emergency message data stream Z, the emergency message can be encoded in appropriate format for the sub-channel. As an example, the emergency message Z as indicated by the emergency notification system 125 can be replicated and/or encoded in accordance with the first encoding format (e.g., same encoding format as original content A transmitted in the first sub-channel) for transmission in lieu of content A on channel 122; the emergency message Z as indicated by the emergency notification system 125 can be replicated and/or encoded in accordance with the second encoding format (e.g., same encoding format as original content B transmitted in the second sub-channel) for transmission in lieu of content B on channel 122; the emergency message Z as indicated by the emergency notification system 125 can be replicated and/or encoded in accordance with the third encoding format (e.g., same encoding format as original content C transmitted in the third sub-channel) for transmission in lieu of content C on channel 122; and so on.

Thus, in response to receiving an emergency notification control signal (such as control input 105-1 at approximately time T1), the content management resource 140 substitutes each of the multiple digital data streams A, B, C of content 111 in the multi-stream data channel 122 with a respective instance of the emergency notification digital data stream. The content management resource 140 encodes the (multi-stream data) channel 122 including the multiple instances of the emergency notification digital data stream to one or more subscribers in a network environment.

In this manner, as will be discussed later in this specification, one or more subscribers tuned to receive and playback of content transmitted in channel 122 can be notified of the occurrence of an emergency without having to tune to a different channel and/or change a decoder that is used to decode data on a respective sub-channel of the channel 122 to which the playback device is tuned. As mentioned, data streams in the channel 122 can be encoded for play back by different types of media players. The emergency message data stream Z can be encoded into appropriate format for a respective sub-channel for seamless playback of the respective emergency message.

In addition to providing an alert of the emergency message, a state of the control input 105-1 can indicate completion of the emergency message. In response to detecting completion of transmitting the emergency message in channel 122 as specified by the control input 105-1, the content management resource 140 reverts back to populating the channel 122 with the received digital data streams of content A, B, and C.

As an example, the content management resource 140 can receive a notice of completion of transmitting the emergency notification digital data stream in the channel 122. In accordance with the notice of completion of transmitting the message data stream Z: the content management resource 140 can be configured to i) populate the first sub-channel of channel 122 with the digital data stream A again, and ii) populate the second sub-channel of channel 122 with the digital data stream B again; iii) populate the third sub-channel of channel 122 with the digital data stream C again; and so on. The content management resource 140 then broadcasts the multi-stream data channel 122 including the digital data streams A, B, and C over the network.

Upon resuming transmission of the data streams A, B, etc., the content management resource 140 can transmit the next segments A3, B5, C9, etc., in channel 122 or skip over transmission of the segments that would otherwise have been transmitted if there was no emergency message.

In one embodiment, the content management resource 140 is or includes a statistical multiplexer configured to facilitate broadcast of one or more types of content such as audio, video, etc. The content management resource 140 can be configured to aggregate content and enable broadcasters to provide audio or video services for a given channel bandwidth by sharing a pool of fixed bandwidth among multiple services or streams of constant or varying bitrates. The content management resource 140 can be configured to allocate, to each service, the bandwidth required for its real-time needs so that services with complex images receive more bandwidth than services with less complex ones. Sharing of bandwidth on channel 122 results in efficient use of the available bandwidth.

In accordance with one embodiment, the content management resource 140 can be configured to provide multiplexing via packet mode or packet-oriented communications, which among others is utilized in packet switched computer networks. In such an embodiment, as previously discussed, each content stream A, B, C can be divided into packets and/or segments that normally are delivered asynchronously in a first-come first-serve fashion. In an alternative fashion, the packets may be delivered according to a desired schedule for fair queuing or differentiated and/or guaranteed quality of service.

Figure 2:
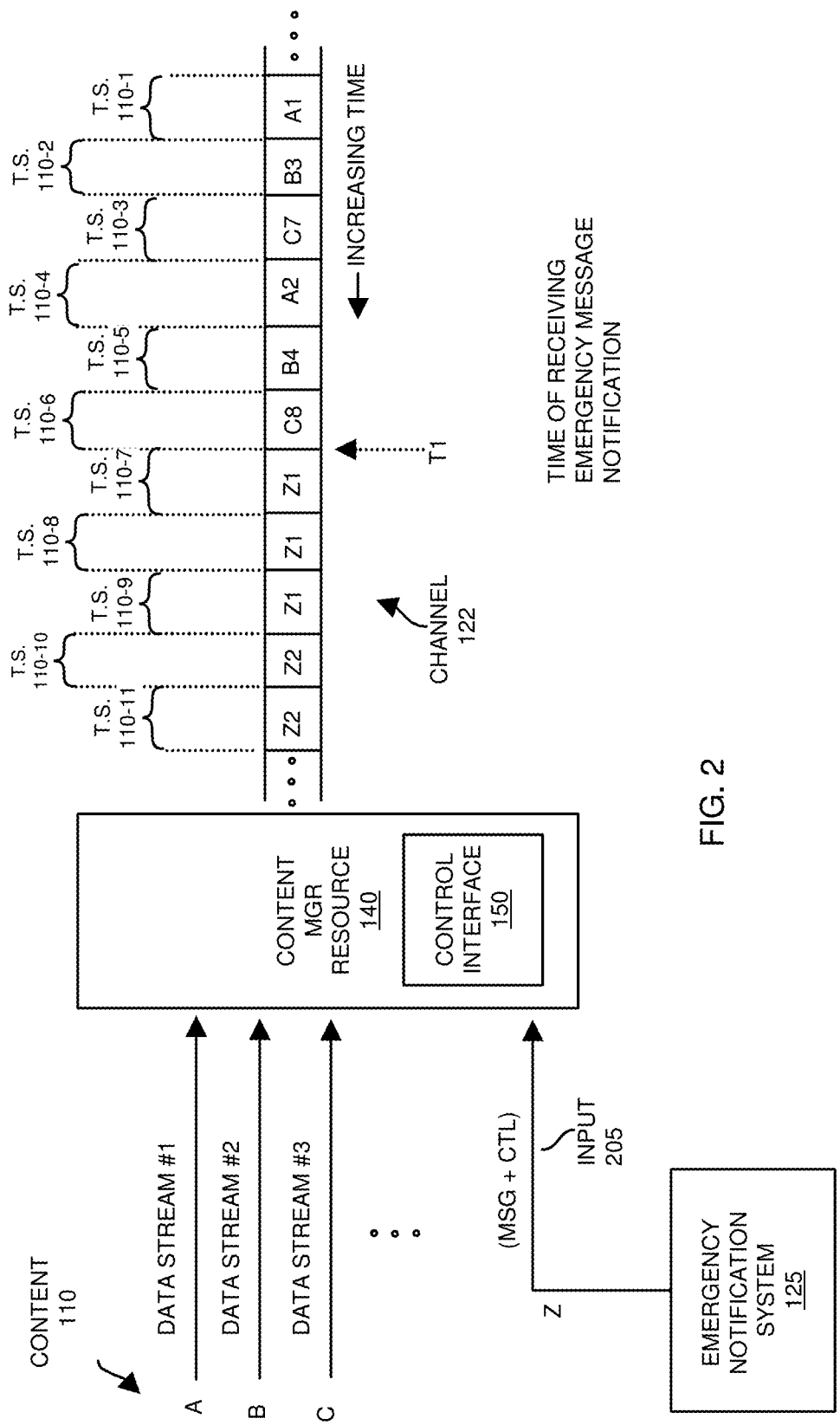
FIG. 2 is an example diagram illustrating processing of digital content and delivering emergency messages according to embodiments herein.

FIG. 2 is an example diagram illustrating processing of digital content and distribution of content according to embodiments herein.

In accordance with the embodiments as discussed above with respect to FIG. 1, the content management resource 140 receives the emergency notification control signal (e.g., control signal 105-1) out-of-band with respect to the emergency message data stream Z. That is, as shown in FIG. 1, the control input 105-1 can be received on a separate physical link than the physical link on which message input 105-2 is received. As previously discussed, the content management resource 140 utilizes a detected state of the (out-of-band) control signal (e.g., control input 105-1) as a basis of whether to substitute and/or transmits the emergency message digital data stream Z in channel 122.

In accordance with another embodiment, as shown in FIG. 2, the control signal indicating occurrence of the emergency message can be encoded within the same data stream that includes the emergency message. For example, the content management resource 140 can be configured to monitor input 205 (such as a emergency notification digital data stream) from emergency notification system 125 for presence of one or more control signal, commands, etc., indicating to switchover to transmission of the emergency message. Upon detecting presence of the control signal to perform switchover, the content management resource 140 further processes the input 205 to obtain the emergency message from the combined message/command data stream. In accordance with a received command indicating to broadcast a respective emergency message, the content management resource 140 initiates transmission of the retrieved emergency message in channel 122 in a similar manner as discussed above.

Thus, the control plane for controlling transmission of the emergency messages can vary depending on the embodiment.

Note that the data stream Z can be received on any type of channel. For example, in one embodiment, the data stream Z can be received on a shared multi-stream data channel. In other words, the emergency message data stream can be encoded on a received input channel along with one or more other data streams in a multi-stream data channel. The content management resource 140 processes the input to retrieve the emergency message. In accordance with alternative embodiments, the data stream Z can be received on a single data stream data channel including data stream Z.

Figure 3:
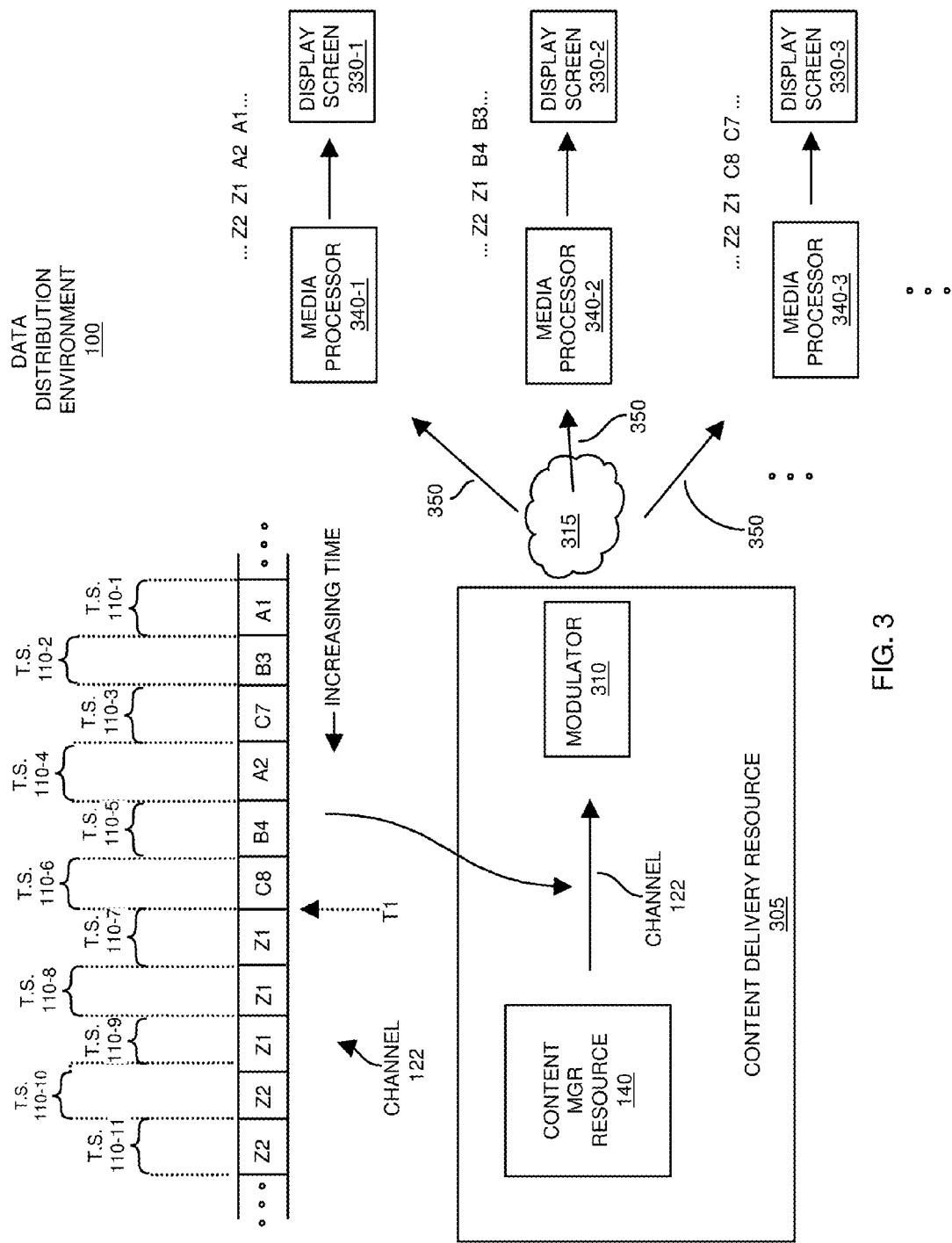
FIG. 3 is an example diagram illustrating modulation and distribution of content and emergency messages according to embodiments herein.

FIG. 3 is an example diagram illustrating modulation and distribution of content and emergency messages according to embodiments herein.

In this non-limiting example embodiment, data distribution environment 100 includes content delivery resource 305. Content delivery resource 305 includes content management resource 140 and modulator 310.

As its name suggests, modulator 310 modulates the received channel 122 (e.g., stream of digital information) for subsequent transmission over cable network environment 315 to one or more media processors 340 (e.g., media processor 340-1, media processor 340-2, media processor 340-3, and so on.) In one embodiment, the media processors 340 are media players of the same or different type.

Modulator 310 modulates the digital information in channel 122 in accordance with any suitable modulation standard.

In one non-limiting example embodiment, the modulator 310 receives the channel 122 of information as an MPEG-type signal. The modulator 310 strips off IP header information and modulates the digital information in channel 122 to produce a modulated signal 350 for downstream transmission. By way of a non-limiting example, the modulated signal 350 can be a QAM (Quadrature Modulation Amplitude) signal for transmission over cable network environment 310 to one or more subscribers in a cable network environment.

In one embodiment, the content delivery resource 305 produces the modulated signal 350 to be an MPEG transport stream for digital TV transmission. Statistical multiplexing in the content management resource 140 can be used to allow several video, audio, and data streams of different data rates to be transmitted over a bandwidth-limited channel. The packets may be of constant or varying lengths. The sub-channel numbers for the different content can be denoted by a respective Program ID (PID) value. The media players can be configured to use the program identifier value to determine to which stream respective content is associated.

In the cable network environment 315, each of one or more subscribers in a cable network service group can be configured to receive the transmitted, modulated signal 350. For example, a first subscriber operating media processor 340-1 can receive the signal and tune to the first sub-channel to playback content A on display screen 330-1. A second subscriber operating media processor 340-2 can receive the modulated signal and tune to the second sub-channel to playback content B on display screen 330-2. A third subscriber operating media processor 340-3 can receive the modulated signal and tune to the third sub-channel to playback content C on display screen 330-3; and so on.

Thus, in accordance with one embodiment, the content delivery resource 305 can produce the channel 122 as a multi-stream data channel. The content delivery resource 305 broadcasts the multi-stream data channel as a modulated signal over a network 315 to subscribers. The multiple subscribers tune to the different sub-channels and individually play back content in the multi-stream data channel 122 at multiple different locations in the cable network environment 315.

As previously discussed, in accordance with an emergency notification control signal, the content management resource 140 can be configured to populate each of the different sub-channels of channel 122 with an appropriate instance of the emergency notification digital data stream. As mentioned, the content management resource 140 can include an appropriate program identifier value in each of the time slots, including the time slots (e.g., time slot 110-7, time slot 110-8, time slot 110-9, . . . packets of data with the segments of the emergency message data stream Z to notify the downstream media players to which stream the segment of the emergency message belongs.

Figure 4:
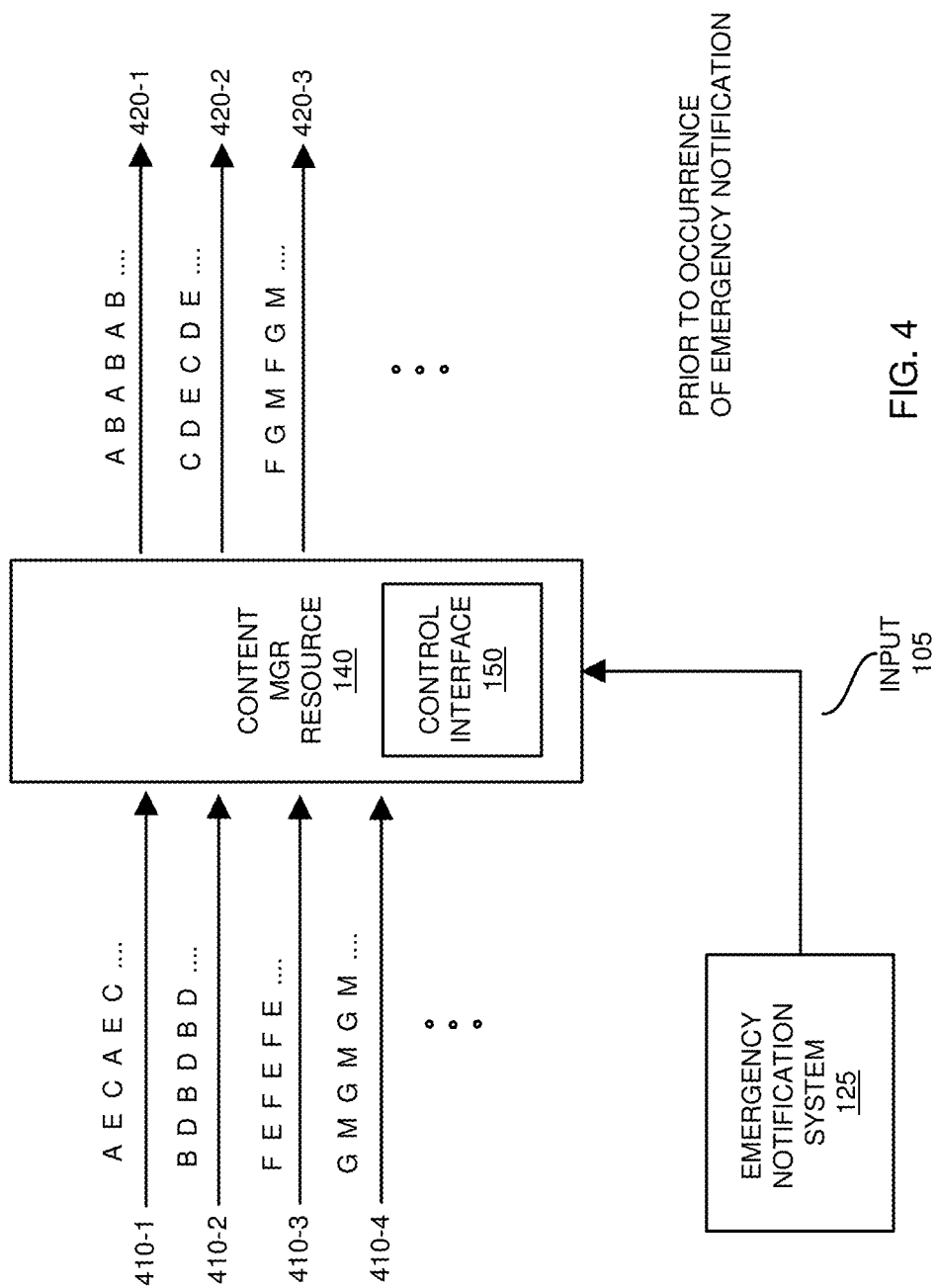
FIGS. 4 and 5 illustrate multi-channel data stream processing of content and distribution of emergency messages according to embodiments herein.
Figure 5:
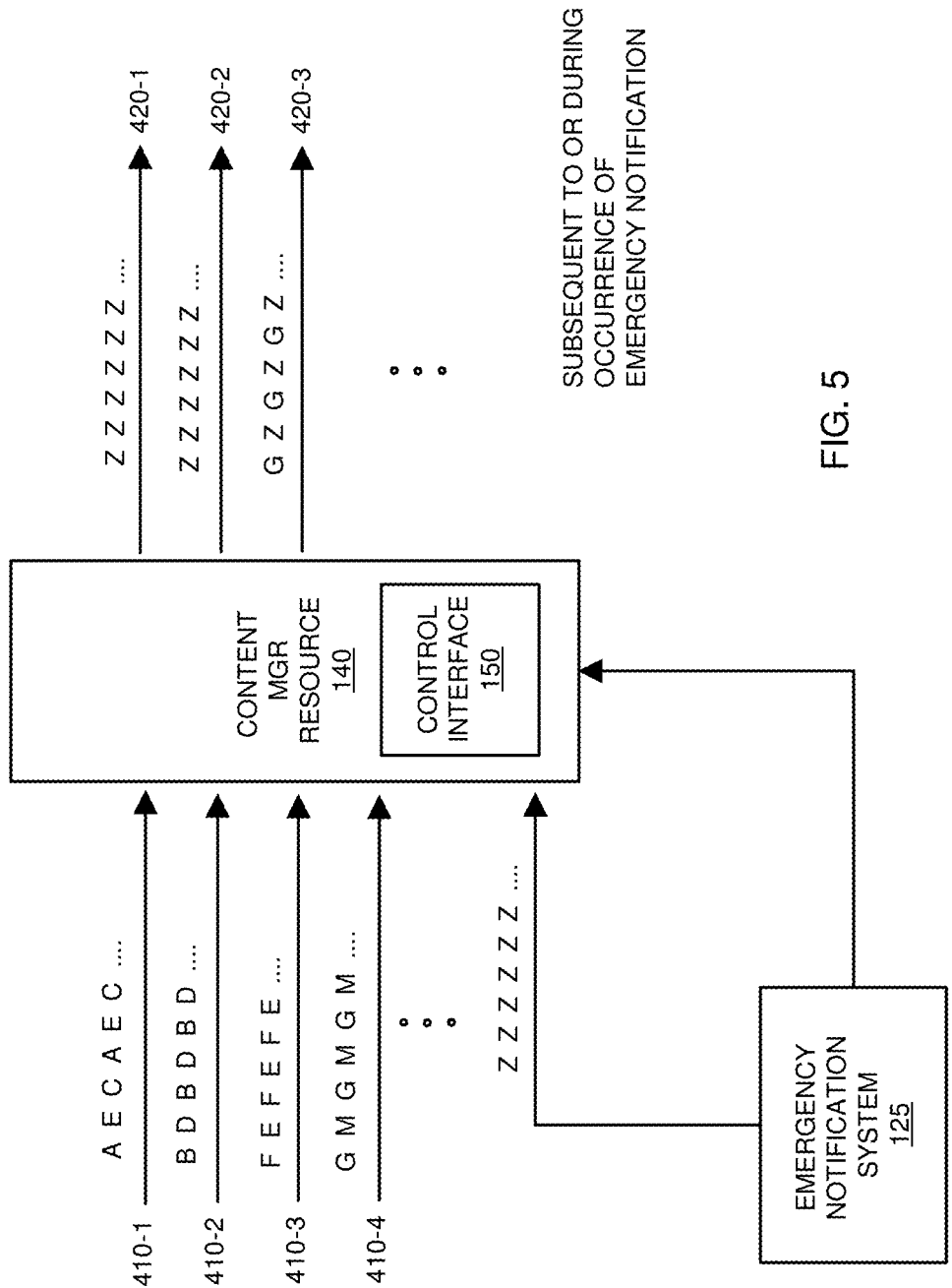

FIGS. 4 and 5 illustrate multi-channel data stream processing and distribution of emergency messages according to embodiments herein In this example embodiment, the content management resource 140 receives multiple multi-stream data channels 410 (e.g., multi-stream data channel 410-1, multi-stream data channel 410-2, multi-stream data channel 410-3, multi-stream data channel 410-4, etc.). Each outputted multi-stream data channel 420 embodiments herein multi-stream data channel 420-1, multi-stream data channel 420-2, multi-stream data channel 420-3, etc.) conveys multiple data streams of content to downstream users.

As shown, the content management resource 140 multiplexes the received content onto any of one or more outputted multi-stream data channels such as output channels 420 (e.g., output channel 420-1, output channel 420-2, output channel 420-3, and so on). More specifically, the content management resource 140 produces multiple multi-stream data channels for broadcast of different content (e.g., content A, B, C, D, E, F, G . . . ) over a network to multiple subscribers in a cable network environment.

Referring now to FIG. 5, in response to occurrence of an emergency and/or receipt of emergency notification digital data stream Z, the content management resource 140 replicates the emergency notification digital data stream Z into one or more suitable encoding formats in a manner as previously discussed. In this example, the content management resource 140 then broadcasts each respective replicated instance of the emergency notification digital data stream over each of the multiple different sub-channels in the multi-stream data channels 420 to notify the multiple subscribers of the emergency condition.

Thus, embodiments herein can include receiving multiple multi-stream data channels 410 (e.g., multi-stream data channel 410-1, multi-stream data channel 410-2, multi-stream data channel 410-3, multi-stream data channel 410-4, etc.). The content management resource 140 selects which of the data streams in multi-stream data channels 410 to include in outputted channels 420 (e.g., channel 420-1, channel 420-2, channel 420-3, channel 420-4, . . . ). In this example, each of channels 420 is a multi-stream data channels although the channels 420 can include any number of multi-stream data channels and single-stream data channels.

The content management resource 140 produces each of the outputted multi-stream data channels 420 to include one or more data streams from the multi-stream data channels 410. For example, as shown in FIG. 4, channel 420-1 includes interleaving of data stream A and data stream B; channel 420-2 includes interleaving of data stream C, data stream D, and data stream E; channel 420-3 includes interleaving of data stream F, data stream G, and data stream M; and so on. As discussed herein, in response to receiving the emergency message as shown in FIG. 5, the content management resource 140 populates each of the sub-channels in channels 420 with the emergency message data stream in a manner as previously discussed (in FIG. 1) to provide widespread notification of an emergency message to multiple signal subscribers.

Figure 6:
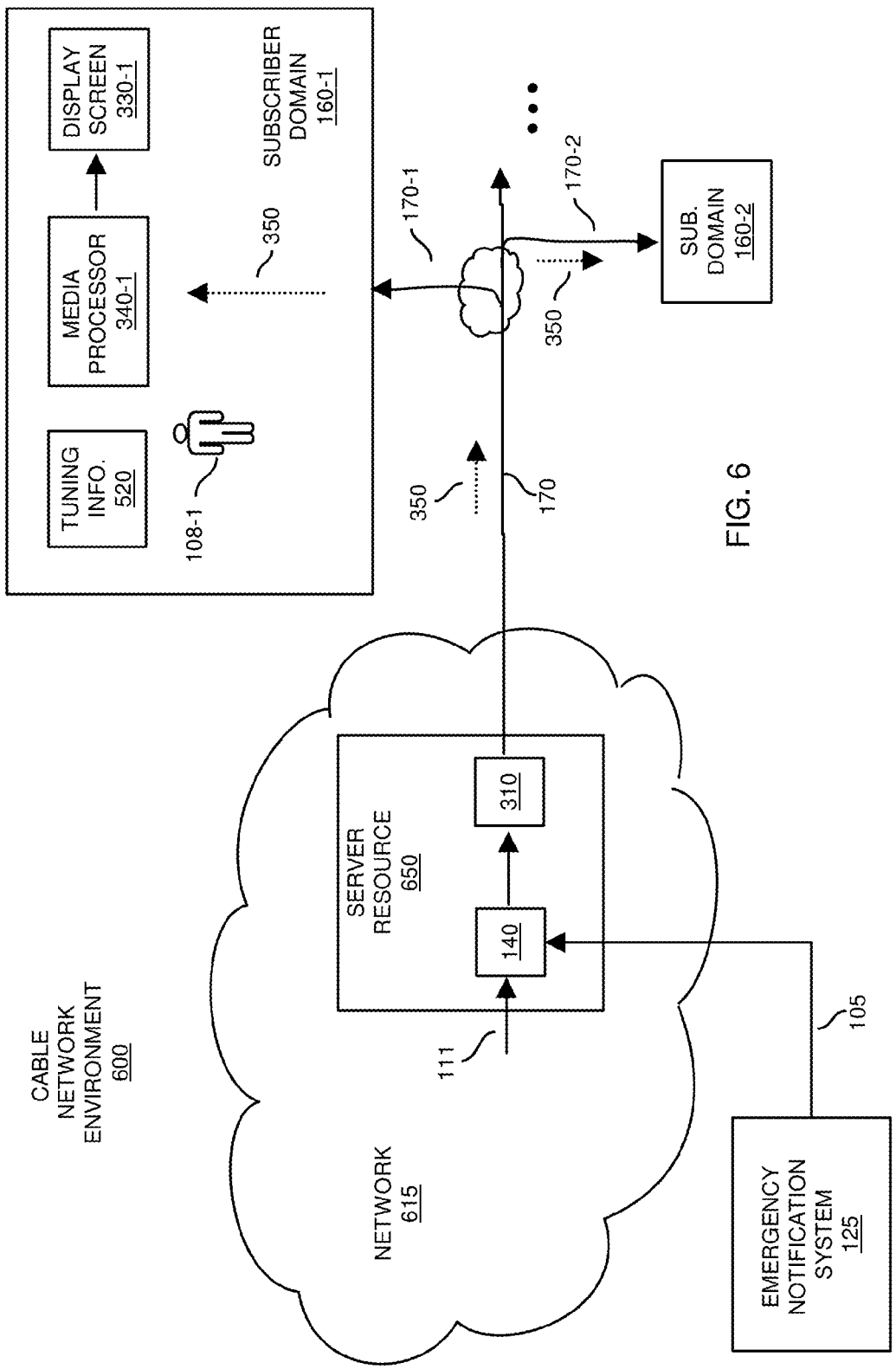
FIG. 6 is an example diagram illustrating distribution of content and emergency message notifications in a cable network environment according to embodiments herein.

FIG. 6 is an example diagram illustrating distribution of content in a cable network environment according to embodiments herein.

As shown, cable network environment 600 includes cable network 615. Cable network 615 includes server resource 650 (such as a so-called edge server) configured to broadcast content to each of multiple subscribers. In this example instance, the server resource 650 receives content 111 (in any suitable manner such as in one or more multi-stream data channel, one or more single-stream data channels, etc.) and produces modulated signal 350.

The server resource 650 broadcasts the modulated signal 350 over a cable network link 170 (e.g., coaxial cable, optical fiber, etc.) to the subscribers in the cable network environment 600. In a manner as previously discussed, the subscribers selectively tune to sub-channels of the modulated signal 350 and play back content as well as the emergency notification digital data stream. That is, each of the subscriber domains 160 (e.g., subscriber domain 160-1, subscriber domain 160-2, etc.) at different locations in cable network environment 600 receives the modulated signal 350 and tunes to a desired sub-channel. Because the emergency message is transmitted on each of the sub-channels, the subscribers are notified of the emergency event message even though each of the subscribers may be tuned to different channels, sub-channel, etc.

In a further embodiment, note that a program scheduler can be configured to generate media guide information indicating availability of the multiple digital data streams of content included in the modulated signal 350. Any suitable resource can be configured to distribute the media guide information (such as tuning information 520) to the subscribers 108. Via the media guide information, the subscribers are able identify availability of content and tune to a specified sub-channel of the modulated signal 350 to playback selected content on channel 350. As previously discussed, the program identifiers can be used to identify to which data streams the respective segments pertain.

Note that as an alternative to including the emergency notification in one or more sub-channels, the content management resource 140 can be configured to transmit the emergency notification control signal (or rendition thereof) on a predetermined channel to a particular subscriber in the network environment viewing previously recorded content on a set-top box.

The subscriber 108-1 in respective subscriber domain 160-1 may be playing back content previously stored on a digital video recorder. The set-top box can be configured to monitor the predetermined channel, sub-channel, etc., for the emergency alert notification. In response to receiving the emergency alert notification, the user's set-top box can be configured to tune to a specified channel and playback the emergency notification digital data stream (on the specified channel) in lieu of playing back the previously recorded content. Thus, even subscribers viewing previously recorded content can be notified of an emergency event and message.

Figure 7:
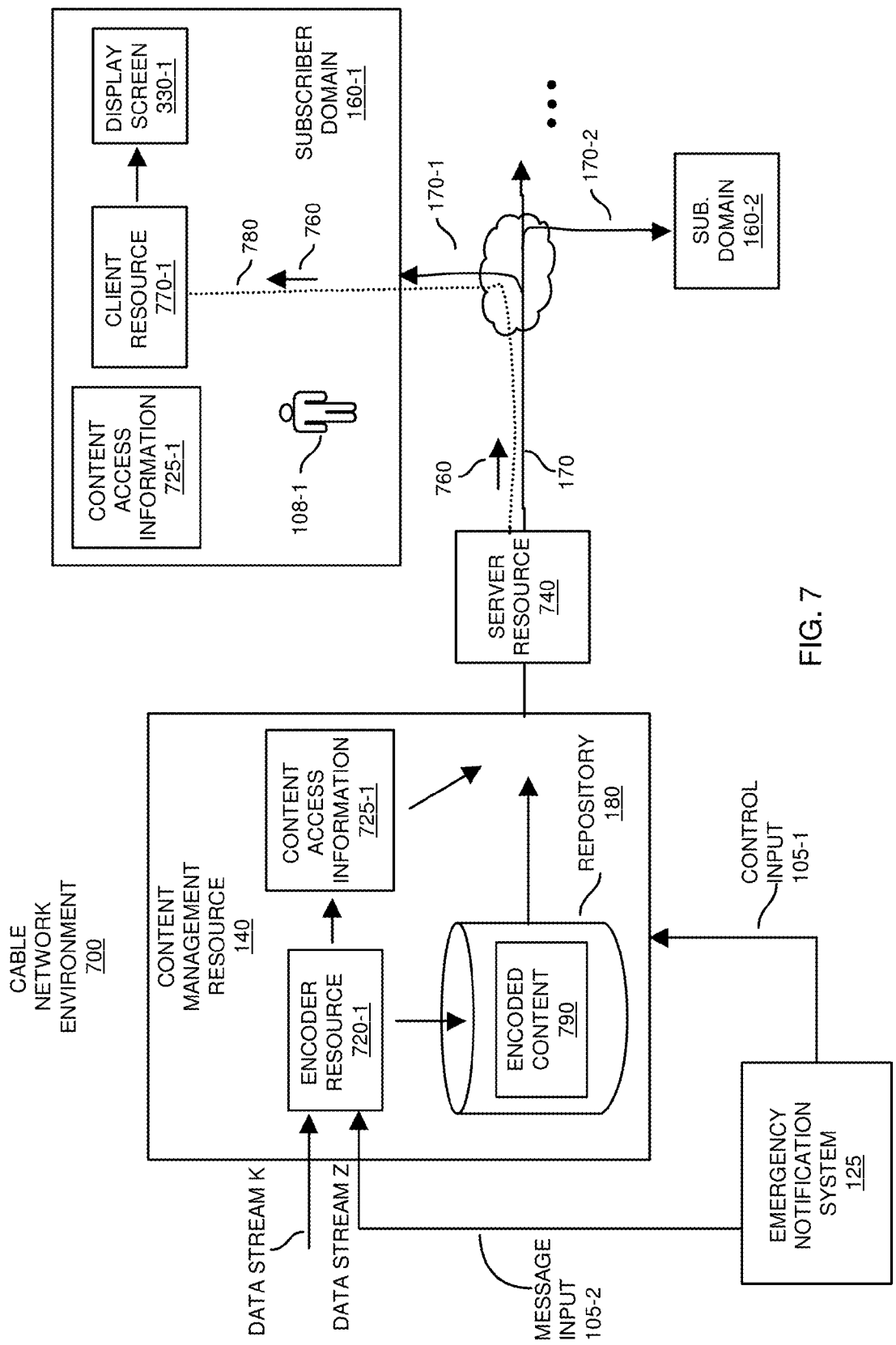
FIG. 7 is an example diagram illustrating distribution of content and emergency messages in a cable network environment according to embodiments herein.

FIG. 7 is an example diagram illustrating distribution of content and messages over a network link in a cable network environment according to embodiments herein.

In accordance with the example embodiment as shown, the user 108-1 in subscriber domain 160-1 can establish a communication session 780 over network link 170-1 between client resource 770-1 and server resource 740.

By way of a non-limiting example, the communication session 780 can be a web-based Internet link on which data is transmitted between the client resource 770-1 and server resource 740 in accordance with a suitable protocol such as the HTTP (Hyper Text Transfer Protocol). In one embodiment, the communication session 780 can be considered a data channel on which the subscriber receives encoded content. The communication session 780 or data channel can be a unicast link, multicast link, etc.

The communication session 780 can be established on a DOCSIS (Data Over Cable Service Interface Specification) type channel in a cable network environment 700. In such an instance, to support communications, the client resource 770-1 addresses data packets using a destination address of the server resource 740 to communicate the data packets to the server resource 740. To support communications in an opposite direction, the server resource 740 creates data packets to include a destination address of the client resource 770-1 to communicate data packets to the client resource 770-1.

In this example, assume that the user 108-1 operates the client resource 770-1 (e.g., a browser on a computer system) to request streaming of data stream K amongst multiple possible available data streams. In such an instance, as further discussed below, the server resource 740 initiates retrieval of data stream K for subsequent encoding and streaming to user 108-1.

Note that, in one embodiment, in addition to specifying content to be retrieved, the user 108-1 can specify a desired format in which the content management resource 140 is to encode the requested content.

In this example embodiment, content management resource 140 includes encoder resource 720-1. Encoder resource 720-1 receives the data stream K for processing. Data stream K can be an analog or digital signal received in accordance with any suitable format.

As its name suggests, the encoder resource 720-1 encodes data stream K into encoded content 790. Encoder resource 720-1 stores encoded content 790 in repository 180 for selective retrieval by one or more subscribers in the cable network environment 700.

Figure 8:
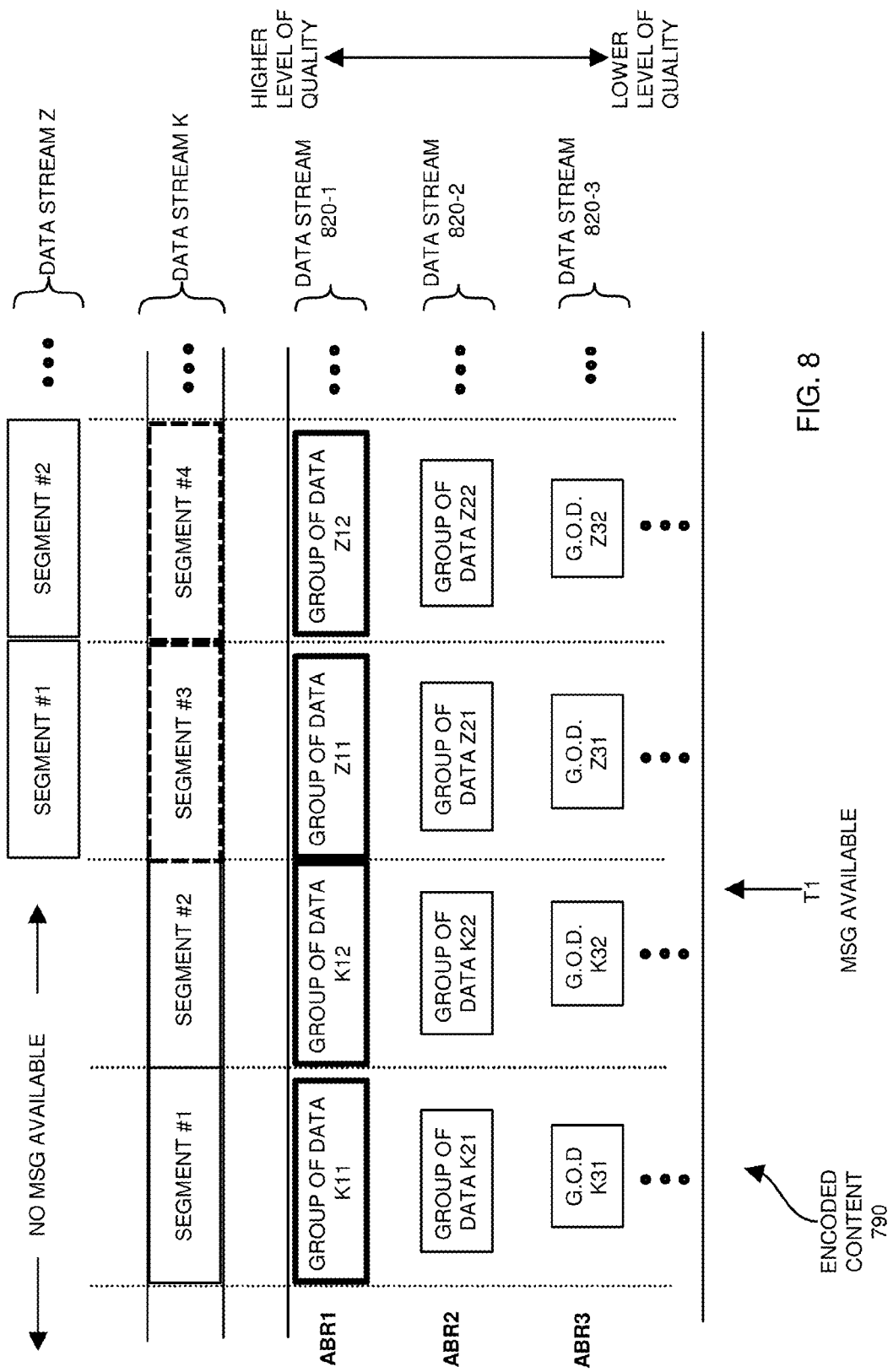
FIG. 8 is an example diagram illustrating generation of an emergency message at different bit rates or levels of quality according to embodiments herein.

FIG. 8 is an example diagram illustrating encoded content according to embodiments herein.

As shown, the encoder resource 720-1 can be configured to partition the data stream K into suitable segments including segment #1, segment #2, segment #3, segment #4, etc. Each segment includes a portion of playable content in the data stream K. The segments of data stream K can represent any suitable type of data such as portions video, audio, etc., for playback on a playback device.

By way of one non-limiting example embodiment, the encoder resource 720-1 encodes each segment of the received data stream K into multiple different levels of quality for selective retrieval. In this example, BR1 represents a highest available bit rate and supports playback of respective content at a highest level of quality; BR2 represents a next lower available bit rate and supports playback of respective content at a next lower level of quality; BR3 represents a next lower available bit rate and supports playback of respective content at a next lower level of quality; and so on.

As pictorially shown, the number of bits of data needed to represent each group of data decreases for each next lower level of quality in the hierarchy. This is because renditions of higher levels of quality of the respective segments typically require more data. Lower levels of quality require less encoded data.

In the encoding process, the encoder resource 720-1 receives and encodes the first received segment (i.e., segment #1) at multiple different bit rates. For example, as shown, the encoder resource 720-1 encodes the segment #1 of data stream K as grouping of data K11 at bit rate BR1, grouping of data K21 at bit rate BR2, grouping of data K31 at bit rate BR3, etc.

As mentioned, grouping of data K11 enables a respective media player to playback the segment #1 of data stream K at a highest level of quality (e.g., bit rate BR1); grouping of data K21 enables a respective media player to playback the segment #1 of data stream K at a next lower level of quality (e.g., bit rate BR2); grouping of data K31 enables a respective media player to playback the segment #1 of data stream K at a next lower level of quality (e.g., bit rate BR3); and so on. As discussed below, the decoder in the client device can be configured to select amongst the different available bit rates to play back at any given time.

The encoder resource 720-1 continues to encode each segment of the data stream K until receiving notification of an emergency message data stream Z generated by the emergency notification system 125.

In accordance with one embodiment, in response to receiving the alert notification (e.g., via control input 105-1) from the emergency notification system 125, as shown, the encoder resource 720-1 in the content management resource 140 switches from encoding data stream K into the groupings of data to encoding data stream Z into the different groupings of data.

In one embodiment, in a similar manner as discussed above, when the message data stream Z is required to be transmitted to subscribers in the cable network environment 700, the encoder resource 720-1 encoded the groupings of data at the different levels of quality using the data stream Z instead of the originally requested data stream K.

For example, subsequent to a time of the alert at approximately time T1, instead of encoding segment #3 of the requested data stream K, the encoder resource 720-1 switches to encoding segment #1 of data stream Z into the groupings of data at the different levels of quality. More specifically, as shown, the encoder resource 720-1 encodes segment #1 of data stream Z into multiple different levels of quality including grouping of data Z11 at bit rate BR1, grouping of data Z21 at bit rate BR2, grouping of data Z31 at bit rate BR3, and so on. The encoder resource 720-1 encodes segment #2 of data stream Z into multiple different levels of quality including grouping of data Z12 at bit rate BR1, grouping of data Z22 at bit rate BR2, grouping of data Z32 at bit rate BR3, and so on.

When switching over from encoding data stream Z into the data streams 820 in lieu of data stream K, the encoder resource 720-1 can wait until a next detected I-frame in the data stream K to perform the switchover to encoding the segments of the data stream Z.

Each grouping of data can be or represent a retrievable file of data. A combination of the files represents an entire data stream. As mentioned, the media player devices use the files of data to playback a respective stream of data such as video, audio, etc. The files can be retrieved from different network addresses.

Thus, upon receiving notification of the message represented by data stream Z, the encoder resource 720-1 substitutes the originally requested content (e.g., data stream K) with the message represented by data stream Z. In this example, data stream 820-1 includes a combination of content from data stream K and content from data stream Z. Encoder resource 720-1 produces content access information 725-1 to indicate the different groupings of data associated with data stream 820 (e.g., data stream 820-1, data stream 820-2, data stream 820-3, etc.).

Each of the data streams 820 can be considered a data channel. For example, data stream 820-1 can be a first channel; data stream 820-2 can be a second channel; and so on. As discussed below, the subscribers select amongst the channels for play back of content.

If no emergency alert was received, the data stream 820-1 would include groupings of data K11, K12, K13, K14, . . . . Because the alert was received, the encoder resource 720-1 produces data stream 820-1 to include groupings of data K11, K12, Z11, Z12, . . . . Additionally, because the alert was received, the encoder resource 720-1 produces data stream 820-1 to include groupings of data K21, K22, Z21, Z22, . . . ; and so on.

Referring again to FIG. 7, as mentioned, the encoder resource 720-1 produces content access information 725-1 (such as a so-called manifest) for respective encoded content 790. In one embodiment, the content access information 725-1 is constantly updated and indicates the availability of the encoded content at the different bit rates. The client resource 770-1 receives the constantly updated content access information 725-1 as data is played back on the data stream 330-1.

In one embodiment, the client resource 770-1 retrieves updated copies of the content access information 725-1. Content access information 725-1 indicates the availability of the requested content (e.g., data stream K) at the different levels of quality or bit rates. In one embodiment, the content access information 725-1 indicates one or more network addresses from which to receive the groupings of data at the different bit rates.

A decoder resource disposed in the client resource 770-1 uses the content access information 725-1 to retrieve the portions (e.g., grouping of data) of the available encoded data stream 820 at an appropriate bit rate. As portions (i.e., groupings of data) in a data stream 820 are consumed and played back, a decoder in the client resource 770-1 initiates retrieval of a next encoded segment of a selected data stream.

In the presence of high congestion, the communication session 780 may support less bandwidth. In such an instance, the decoder in the client resource 770-1 may initiate retrieval of a next segment in the sequence for playback at a lower bit rate. For example, the client resource 770-1 can retrieve grouping of data K11 for playback. In response to detecting a condition such as congestion, and in accordance with the available encoded information as specified by the content access information 725-1, the client resource 770-1 can initiate retrieval of grouping of data K22. If the congestion persists and becomes worse, in accordance with the available encoded information as specified by the content access information 725-1, the client resource 770-1 can initiate retrieval of grouping of data Z31.

Thus, in one embodiment, the client resource 770-1 pulls or retrieves different encoded levels of quality of a data stream (e.g., groupings of data K11, K22, Z31, Z32, etc.) for playback on the data stream 330-1.

In the presence of low congestion, the communication session 780 may support higher bandwidth. In such an instance, the decoder in the client resource 770-1 may initiate retrieval of a next segment in the sequence at a higher bit rate. For example, the client resource 770-1 can initially retrieve and playback grouping of data K31. In response to detecting availability of greater bandwidth, the client resource 770-1 can initiate retrieval of grouping of data K22, followed by retrieval of grouping of data Z11, grouping of data Z12, etc. The decoder in the client resource 770-1 initiates playback of the encoded segments (grouping of data K31, grouping of data K22, grouping of data Z11, grouping of data Z12, etc.) on display screen 330-1.

In this manner, depending on factors such as network congestion, decoder's ability to playback content, etc., the client resource 770-1 adapts the bit rate of retrieving encoded segments of data.

Note that additional details of supporting adaptive bit rate communications are shown and described in related U.S. patent application Ser. No. 13/441,355 entitled "VARIABILITY IN AVAILABLE LEVELS OF QUALITY OF ENCODED DATA,", filed on Apr. 6, 2012, the entire teachings of which are incorporated herein by this reference. In accordance with embodiments herein, the available message data stream Z is included in portions of the adaptive bit rate stream depending on a control signal. The user 108-1 need not tune to a new channel as the adaptive bit rate data stream retrieved by the subscriber includes the message.

Encoding the selected data stream K and the message data stream Z in accordance with multiple bit rates is useful over conventional techniques. For example, during an emergency situation, it is likely that the amount of traffic over the Internet will substantially increase, resulting in network congestion. Encoding of the segments including the message data stream Z at the lower bit rates enables the decoders in the respective client resources to continue to receive and playback a respective message, albeit at a potentially lower level of quality. Thus, multiple different users may be retrieving content in an adaptive bit rate data stream in a unicast manner. Instead of notifying the users to switchover to a new channel to receive a message, embodiments herein include substituting requested content with the message during a situation in which the message must be broadcasted or simultaneously transmitted to many unicast type users.

Additionally, embodiments herein enable widespread distribution of messages. For example, as previously discussed, the content management resource 140 as discussed herein can be configured to modify distribution of scheduled content or linear TV programs, video on demand, etc., to include a notification message in lieu of broadcasting or multicasting portions of originally scheduled or requested content. As discussed, certain users in a cable network environment 700 may be retrieving content for viewing in accordance with IPTV in a unicast manner. For example, instead of playing back broadcasted content, one or more users can "pull" content from a server resource for viewing over a unicast link.

In the event of receiving an alert for broadcast, it may be desirable to distribute the received message to all subscribers, regardless of whether they are viewing broadcasted content or retrieving content from a server in a unicast manner, multicast manner, etc. In such an instance, the content management resource 140 simultaneously implements both methods of providing notifications. That is, the content management resource 140 can be configured to modify broadcasted data streams to include the alert message as discussed in FIGS. 1-6. Additionally, the content management resource 140 can be configured to produce retrievable content to include the alert message as discussed in FIGS. 7 and 8 for unicast links.

Note again that the use of an emergency message is shown by way of non-limiting example only and that the content management resource can dynamically include, on demand, any type of unscheduled messages (e.g., emergency message, non-emergency message, advertisement, etc.) in the available content.

Figure 9:
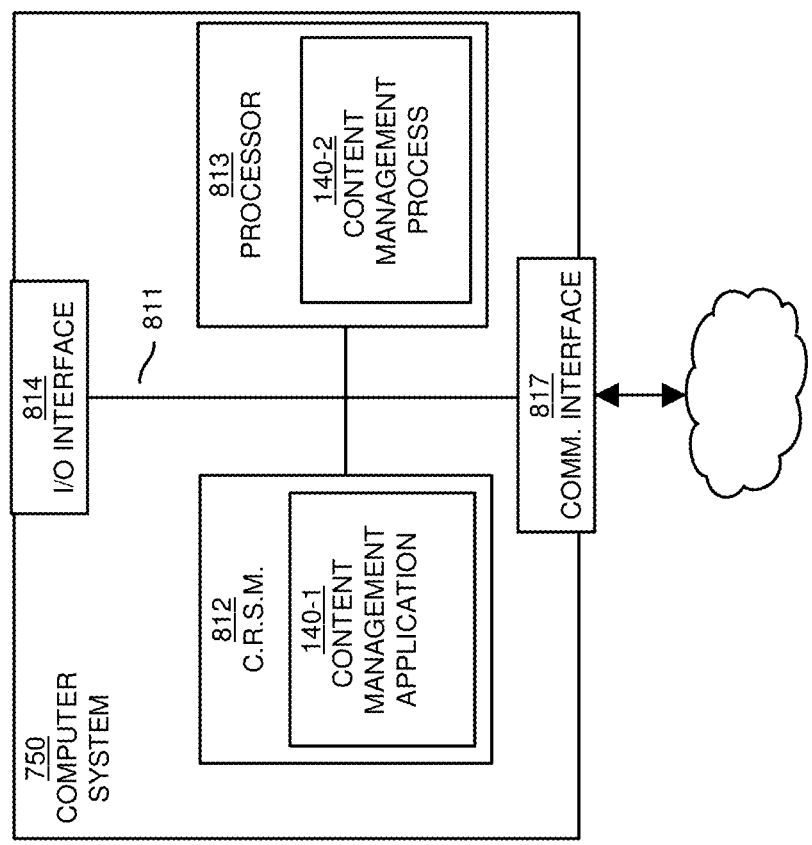
FIG. 9 is an example diagram illustrating a computer architecture in which to execute one or more embodiments as discussed herein.

FIG. 9 is an example block diagram of a computer system for implementing any of the operations as discussed herein according to embodiments herein.

As shown, computer system 750 of the present example can include an interconnect 811 that couples computer readable storage media 812 such as a non-transitory type of media (i.e., any type of hardware storage medium) in which digital information can be stored and retrieved, a processor 813, I/O interface 814, and a communications interface 817.

I/O interface 814 provides connectivity to a repository and, if present, other devices such as a display screen, keypad, a computer mouse, etc.

Computer readable storage medium 812 can be any hardware storage device such as memory, optical storage, hard drive, floppy disk, etc. In one embodiment, the computer readable storage medium 812 stores instructions and/or data.

Communications interface 817 enables the computer system 150 and processor 813 to communicate over a resource such as a network to retrieve information from remote sources and communicate with other computers. I/O interface 814 enables processor 813 to retrieve stored information from one or more repositories.

As shown, computer readable storage media 812 is encoded with content management application 140-1 (e.g., software, firmware, etc.) executed by processor 813. Content management application 140-1 can be configured to include instructions to implement any of the operations as discussed herein.

During operation of one embodiment, processor 813 accesses computer readable storage media 812 via the use of interconnect 811 in order to launch, run, execute, interpret or otherwise perform the instructions in content management application 140-1 stored on computer readable storage medium 812.

Execution of the content management application 140-1 produces processing functionality such as content management process 140-2 in processor 813. In other words, the content management process 140-2 associated with processor 813 represents one or more aspects of executing content management application 140-1 within or upon the processor 813 in the computer system 750.

Those skilled in the art will understand that the computer system 750 can include other processes and/or software and hardware components, such as an operating system that controls allocation and use of hardware resources to execute content management application 140-1.

In accordance with different embodiments, note that computer system may be any of various types of devices, including, but not limited to, a mobile computer, a personal computer system, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or in general any type of computing or electronic device. The computer system 150 may reside at any location or can be included in any suitable resource in network environment 100 to implement functionality as discussed herein.

Functionality supported by the different resources will now be discussed via flowcharts in FIGS. 10-12. Note that the steps in the flowcharts below can be executed in any suitable order.

Figure 10:
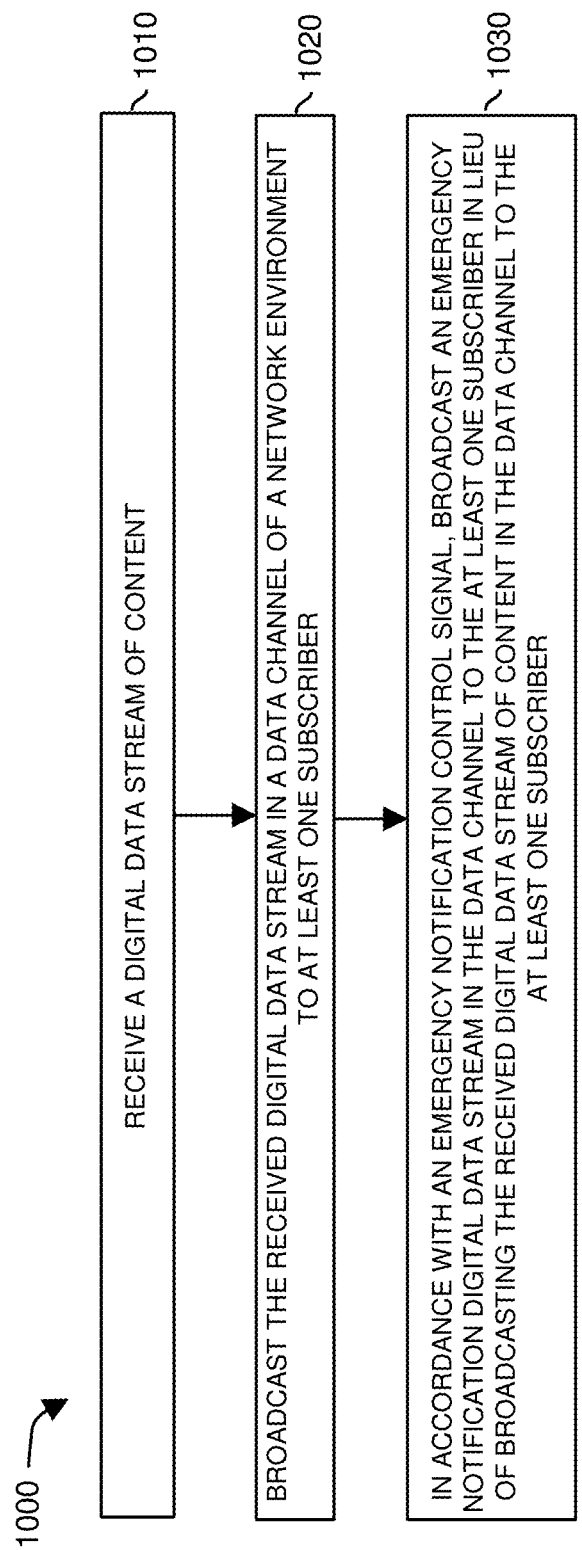
FIGS. 10, 11, and 12 are example diagrams illustrating methods of processing and distributing content and emergency messages according to embodiments herein.

FIG. 10 is a flowchart 1000 illustrating an example method of providing access to a network according to embodiments. Note that there will be some overlap with respect to concepts as discussed above.

In processing block 1010, the content management resource 140 receives a digital data stream A of content.

In processing block 1020, the content management resource 140 broadcasts or transmits the received digital data stream A in channel 122 of a network environment to one or more subscribers.

In processing block 1030, in accordance with an emergency notification control signal such as control input 105-1, the content management resource broadcasts or transmits an emergency notification digital data stream Z in the channel 122 to the one or more subscribers in lieu of broadcasting or transmitting the received digital data stream A in the channel 122 to the one or more subscribers.

Figure 11:
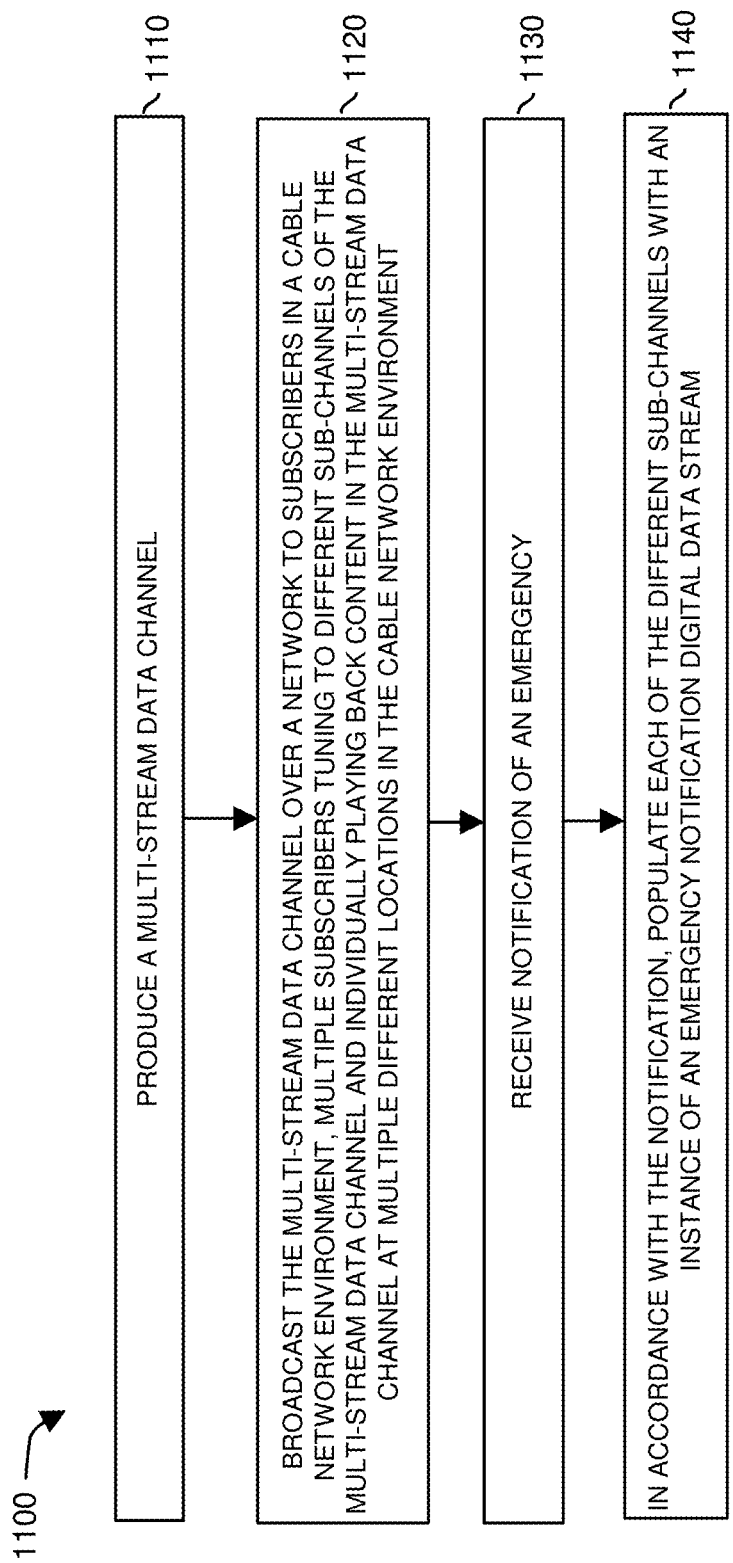

FIG. 11 is a flowchart 1100 illustrating an example method according to embodiments. Note that there will be some overlap with respect to concepts as discussed above.

In processing block 1110, the content management resource 140 produces a multi-stream data channel to include multiple data streams A, B, C.

In processing block 1120, the content management resource 140 broadcasts the multi-stream data channel over a network to subscribers in a cable network environment 600. The multiple subscribers tune to different sub-channels of the multi-stream data channel and individually play back content in the multi-stream data channel at multiple different locations in the cable network environment 600.

In processing block 1130, the content management resource 140 receives notification of an emergency via signal such as control input 105-1.

In processing block 1140, in accordance with the notification, the content management resource 140 populates each of the different sub-channels with an instance of an emergency notification digital data stream.

Figure 12:
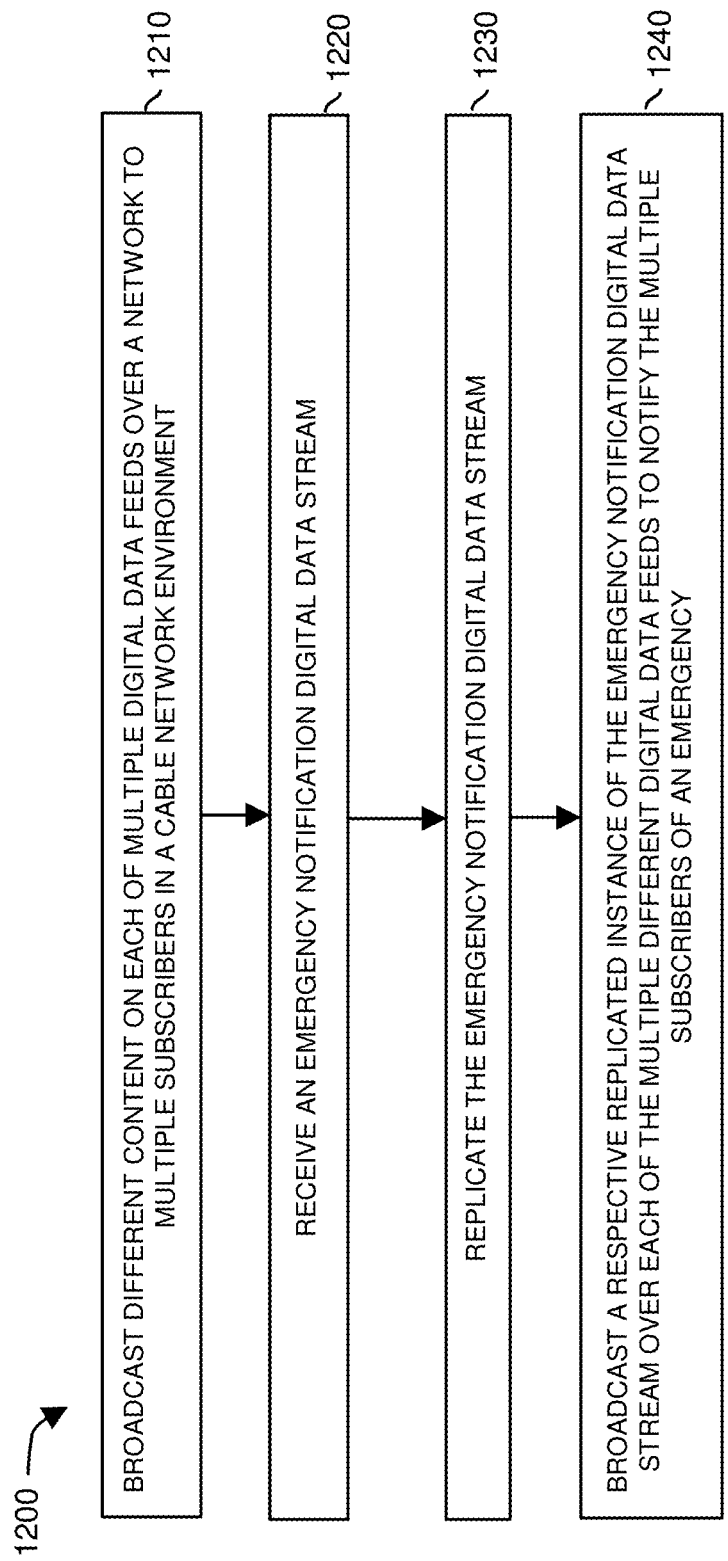

FIG. 12 is a flowchart 1200 illustrating an example method according to embodiments herein. Note that there will be some overlap with respect to concepts as discussed above.

In processing block 1210, the content management resource 140 broadcasts different content (such as data streams) on each of multiple individually modulated digital channels over a network to multiple subscribers in a cable network environment 600.

In processing block 1220, the content management resource 140 receives an emergency notification digital data stream.

In processing block 1230, the content management resource 140 replicates the emergency notification digital data stream In processing block 1240, the content management resource 140 broadcasts a respective replicated instance of the emergency notification digital data stream over each of the multiple different digital channels to notify the multiple subscribers of a respective emergency.

Note again that techniques herein are well suited for distributing messages and/or notifications in a network environment. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
receiving a digital data stream of content;
transmitting the content of the received digital data stream in a data channel of a network environment to at least one subscriber;
encoding segments of an emergency notification digital data stream in accordance with multiple different delivery bit rates; and
in accordance with an emergency notification control signal, transmitting the encoded segments of the emergency notification digital data stream in the data channel to the at least one subscriber in lieu of transmitting the received digital data stream of content in the data channel to the at least one subscriber, the encoded segments of the emergency notification digital data stream transmitted over the data channel in accordance with an adaptive bit rate to the at least one subscriber;
producing content access information, the content access information indicating availability of the encoded segments of the emergency notification digital data stream at the multiple different delivery bit rates;
transmitting the content access information to a particular subscriber in the network environment;
receiving input from the particular subscriber requesting transmission of the encoded segments of the emergency notification digital data stream at a particular bit rate; and
in accordance with the input from the particular subscriber, initiating transmission of the encoded segments of the emergency notification digital data stream to the particular subscriber over the data channel.

2. The method as in claim 1, further comprising:
in response to receiving the emergency notification control signal, substituting content from each of the multiple digital data streams in the multi-stream data channel with an instance of the encoded segments of the emergency notification digital data stream; and
transmitting the multi-stream data channel including the instances of the encoded segments of the emergency notification digital data stream to the at least one subscriber in the network environment.

3. The method as in claim 1 further comprising:
receiving the emergency notification control signal out-of-band with respect to the emergency notification digital data stream; and
utilizing a state of the emergency notification control signal as a basis of whether to substitute the digital data stream of content with the emergency notification digital data stream.

4. The method as in claim 1 further comprising:
processing the emergency notification digital data stream to obtain the emergency notification control signal.

5. The method as in claim 1, wherein the network environment is a cable network environment, the method further comprising: producing each of multiple multi-stream data channels to include portions of different data streams of content; and in accordance with the emergency notification control signal, and in lieu of broadcasting the different data streams of content, broadcasting multiple instances of the encoded segments of the emergency notification digital data stream in each of the multi-stream data channels to the at least one subscriber.

6. The method as in claim 1, wherein transmitting the encoded segments of the emergency notification digital data stream includes:
transmitting the encoded segments as an adaptive bit rate data stream on the data channel to the subscriber device over a unicast link, the adaptive bit rate data stream including portions of the digital data stream and requested segments of the emergency notification digital data stream.

7. The method as in claim 1 further comprising: transmitting the encoded segments of the emergency notification digital data stream at a lower bit rate as specified by the particular subscriber device based on network congestion caused by occurrence of an emergency to which the emergency notification digital data stream pertains.

8. The method as in claim 1, wherein the data channel is a unicast link over which the particular subscriber device initiates retrieval of portions of the digital data stream of content and the emergency notification digital data stream.

9. The method as in claim 8 further comprising:
updating the content access information to indicate replacement of segments of the digital data stream of content encoded at the multiple different delivery bit rates with the encoded segments of the emergency notification digital data stream at the multiple different delivery bit rates.

10. The method as in claim 9 further comprising:
transmitting the encoded segments of the emergency notification digital data stream at a less than maximum available bit rate in anticipation of network congestion in the network environment caused by occurrence of an emergency to which the emergency notification digital data stream pertains.

11. The method as in claim 1, wherein the content access information is updated content access information, the updated content access information indicating replacement of encoded segments of the digital data stream of content at the multiple different delivery bit rates with the encoded segments of the emergency notification digital data stream at the multiple different delivery bit rates.

* * * * *